United States Patent
Brüning et al.

(10) Patent No.: US 9,822,034 B2
(45) Date of Patent: Nov. 21, 2017

(54) METHOD FOR ELECTROLESS PLATING

(75) Inventors: Frank Brüning, Berlin (DE); Birgit Beck, Berlin (DE); Bexy Dosse, Berlin (DE); Johannes Etzkorn, Bochum (DE)

(73) Assignee: Atotech Deutschland GmbH, Berlin (DE)

( * ) Notice: Subject to any disclaimer, the term of this patent is extended or adjusted under 35 U.S.C. 154(b) by 331 days.

(21) Appl. No.: 14/116,810

(22) PCT Filed: Apr. 17, 2012

(86) PCT No.: PCT/EP2012/056960
§ 371 (c)(1),
(2), (4) Date: Nov. 11, 2013

(87) PCT Pub. No.: WO2012/156162
PCT Pub. Date: Nov. 22, 2012

(65) Prior Publication Data
US 2014/0113158 A1    Apr. 24, 2014

(30) Foreign Application Priority Data

May 17, 2011 (EP) .................................. 11166399

(51) Int. Cl.
| | | |
|---|---|---|
| *B05D 3/10* | (2006.01) | |
| *C03C 17/40* | (2006.01) | |
| *C23C 18/40* | (2006.01) | |
| *C03C 17/10* | (2006.01) | |
| *C23C 18/18* | (2006.01) | |

(52) U.S. Cl.
CPC ............ *C03C 17/40* (2013.01); *C03C 17/10* (2013.01); *C23C 18/1889* (2013.01); *C23C 18/40* (2013.01); *Y10T 428/12597* (2015.01)

(58) Field of Classification Search
USPC .......... 427/97.9, 99.5, 304, 305, 306, 443.1
See application file for complete search history.

(56) References Cited

U.S. PATENT DOCUMENTS

| | | | | |
|---|---|---|---|---|
| 2005/0170650 A1* | 8/2005 | Fang | .................. | C23C 18/1893 438/689 |
| 2006/0225605 A1* | 10/2006 | Kloeckener | .............. | C02F 5/12 106/14.13 |
| 2008/0000776 A1* | 1/2008 | Wang | ................ | H01L 21/02074 205/80 |
| 2008/0223253 A1* | 9/2008 | Song | ...................... | C23C 18/40 106/1.23 |

FOREIGN PATENT DOCUMENTS

| | | |
|---|---|---|
| EP | 1281787 | 2/2003 |
| JP | S54100931 | 8/1979 |
| JP | 2003049279 | 2/2003 |
| JP | 2003049279 A * | 2/2003 |
| WO | 2010010851 | 1/2010 |

OTHER PUBLICATIONS

Machine translation of JP2003049279(A) by Espacenet, generated on Jul. 7, 2016.*
PCT/EP2012/056960; PCT International Search Report and Written Opinion of the International Searching Authority dated Jun. 10, 2013.
PCT/EP2012/056960; PCT International Preliminary Report on Patentability dated May 22, 2014.
Translation of Official Action for corresponding Japanese Application No. 2014-510709 dated Jan. 25, 2016.

* cited by examiner

*Primary Examiner* — Dah-Wei D Yuan
*Assistant Examiner* — Nga Leung V Law
(74) *Attorney, Agent, or Firm* — Renner, Otto, Boisselle & Sklar, LLP

(57) ABSTRACT

The present invention discloses a method for electroless plating of a metal or metal alloy onto a metal or a metal alloy structure comprising a metal such as molybdenum or titanium and alloys containing such metals. The method comprises the steps of activation, treatment in an aqueous solution comprising at least one nitrogen-containing compound or a hydroxy carboxylic acid and electroless plating of a metal or metal alloy.

7 Claims, No Drawings

METHOD FOR ELECTROLESS PLATING

The present application is a U.S. National Stage Application based on and claiming benefit and priority under 35 U.S.C. §371 of International Application No. PCT/EP2012/056960, filed 17 Apr. 2012, which in turn claims benefit of and priority to European Application No. 11166399.3, filed 17 May 2011, the entirety of each of which is hereby incorporated herein by reference.

FIELD OF THE INVENTION

The present invention relates to a method for electroless deposition of metals and metal alloys in the manufacture of flat panel displays and related devices.

BACKGROUND OF THE INVENTION

Metallisation of different features such as gate structures and circuitry for thin film transistor (TFT) based flat panel displays is achieved by depositing metals such as aluminium, molybdenum, chromium and titanium by vapour phase deposition methods. Increasing panel dimensions require a higher electrical conductivity of the TFT lines to maintain very short pixel response times and avoid motion blur effects in fast moving image sequences.

Due to its low specific resistance copper is a suitable candidate to replace other metals like the ones mentioned before as TFT line material. Sputtering of copper is the conventional method. However, sputtering copper becomes increasingly more problematic as soon as the required film thickness exceeds 1 µm. Sputtered copper films typically exhibit a considerable amount of internal stress which eventually can cause bending or even cracking of the underlying glass substrate. Sputtering thick copper layers also suffers from significant material loss due to comparably low sputter yields. Finally, increased maintenance efforts for cleaning the sputter chambers can lead to prolonged idle times and limit the overall process productivity.

A method for electroless deposition of copper onto substrates for flat panel display applications is disclosed by S. Fang et al. in "Highly Adhesive Copper Wiring for FPD using Inkjet Printed Catalyst and Neutral Electroless Deposition" (IDW '07—Proceedings of the 14th International Display Workshops (2007), Volume 2, pp. 713-714). Here, the substrate is activated prior to electroless metal deposition with a catalytic ink deposited by ink jet printing.

Another method for depositing copper by electroless plating onto a layer of molybdenum is disclosed by H. Ning et al. in "The Feasibility of Cu Plating Technology in LCD" (Proceedings of ASIA Display 2007 AD'07 Shanghai, Mar. 12-16, 2007). Said method utilises a patterned photo resist to selectively deposit copper.

OBJECTIVE OF THE INVENTION

Therefore, it is a first objective of the present invention to provide a surface layer having a high electrical conductivity.

It is a second objective of the present invention to provide metal and metal alloy layers having a smooth surface.

It is a third objective of the present invention to provide a surface layer having a good adhesion on the underlying metal or metal alloy layer.

It is a fourth objective of the present invention to provide metal and metal alloy layers having a low internal stress.

SUMMARY OF THE INVENTION

These objectives are solved by a general process sequence according to the present invention, the general process sequence comprising in this order the steps of
(i) providing a non-conductive substrate having on at least one side a surface consisting of a metal or metal alloy structure selected from the group consisting of molybdenum, titanium, zirconium, aluminium, chromium, tungsten, niobium, tantalum and alloys thereof,
(ii) contacting said substrate with an activator comprising a noble metal,
(iii) contacting said substrate with an aqueous solution containing at least one of a nitrogen-containing substance and a hydroxy carboxylic acid and
(iv) depositing a metal or metal alloy onto said activated surface by means of electroless plating.

The metal or metal alloy deposited in step (iv) has a high adhesion to the underlying metal or metal alloy structure of the substrate surface. Furthermore, said metal or metal alloy layer deposited in step (iv) has a smooth surface, low internal stress and a sufficient electrical conductivity.

DETAILED DESCRIPTION OF THE INVENTION

Substrates for flat panel displays and related devices are made of glass or a polymer foil such as a PET foil. Such non-conductive substrates comprise on at least one side a metal or metal alloy structure which is usually deposited by means of chemical or physical vapour deposition. Said metal or metal alloy structure consists of one or more of molybdenum, titanium, zirconium, aluminium, chromium, tungsten, niobium, tantalum, and alloys thereof.

The term "a metal or metal alloy structure" shall mean herein
a) the entire surface on one or both sides of a non-conductive substrate is covered by a thin metal or metal alloy layer (less preferred) or
b) "a metal or metal alloy structure" comprises a metal pattern on one or both sides of a non-conductive substrate (preferred).

The substrate is cleaned by methods known in the art. Aqueous compositions comprising a wetting agent may be used for this purpose.

Optionally, the metal or metal alloy structure on top of the substrate is then microetched in an aqueous composition comprising a peroxide and an acid.

Deposition of a metal or metal alloy by means of electroless plating onto said metal or metal alloy structure is not feasible without activating said metal or metal alloy structure (step (ii) according to the general process sequence).

The metal or metal alloy structure is first activated with a noble metal selected from the group comprising silver, gold, ruthenium, rhodium, palladium, osmium, iridium and platinum. The most preferred metal for activating the metal or metal alloy structure is palladium.

The noble metal can either be provided in form of ions or as a colloid.

Noble metals provided in form of ions are deposited in metallic state by an immersion type reaction with the underlying less noble metal or metal alloy structure on the substrate surface by dissolving parts of the underlying less noble metal or metal alloy structure. In case the metal or metal alloy structure is activated for electroless plating with noble metal ions the noble metal is deposited in metallic state.

When using a noble metal in form of ions the substrate surface is only activated for successive electroless plating on those areas of the substrate surface which consist of a metal or metal alloy structure. Hence, no mask such as a patterned photo resist is required for a selective electroless deposition in step (iv) according to the general process sequence.

Noble metals provided in form of colloids are deposited onto the entire substrate surface by adsorption, i.e. on both the metal or metal alloy structure and the underlying non-conductive substrate. In case the metal or metal alloy to be deposited by electroless plating in step (iv) according to the general process sequence, those portions of the substrate surface where no metal or metal alloy should be deposited in step (iv) need to be covered by a mask such as a patterned photo resist prior to deposition of the noble metal in form of a colloid. If such portions of the substrate are not covered the metal or metal alloy will be deposited in step (iv) onto the entire substrate surface. In such a case an etching process needs to be applied after electroless plating in order to obtain a patterned metal or metal alloy layer having a high electrical conductivity.

Preferably, the noble metal activator comprises palladium ions. In this case, no etching process is required and the transparency of the substrate is higher compared to a colloidal noble metal (palladium) activator.

Applicable activator compositions providing the noble metal in ionic or colloidal form are for example disclosed in ASM Handbook, Vol. 5 Surface Engineering, 1194, p. 317-318.

Next, the substrate surface comprising a noble metal is contacted in step (iii) according to the general process sequence with an aqueous composition comprising at least one of nitrogen-containing substance and hydroxy carboxylic acids.

Preferably, an aqueous composition comprising at least one nitrogen-containing substance is used in step (iii).

Nitrogen-containing substances are preferably selected from the group consisting of quaternary ammonium polymers, polyamido amines, tetra-ammonium hydroxy compounds having alkyl groups with 2 to 6 carbon atoms, alkanol amines, aminocarboxylic acids, quaternary ammonium salts based on fatty amines and quaternised aliphatic amine ethoxylates.

More preferably, the nitrogen-containing substance is selected from the group consisting of quaternary ammonium polymers and polyamido amines.

Suitable quaternary ammonium polymers include cross-linked quaternary ammonium polymers and non-cross-linked quaternary ammonium polymers.

Suitable cross-linked quaternary ammonium polymers include copolymers formed from a major amount of a monoethylenically unsaturated monomer or mixture of monomers and a minor amount of a polyethylenically unsaturated monomer or mixtures of monomers which act to cross-link the polymer. Examples of monoethylenically unsaturated monomers include polycyclic aromatic compounds such as styrene, substituted styrenes including ethylvinylbenzene, vinyltoluene and vinylbenzyl chloride; and arylic monomers such as the esters of methacrylic and acrylic acid including methyl acrylate, ethyl acrylate, propyl acrylate. Lower aliphatic esters of acrylic acid are preferred. Suitable polyunsaturated cross linking monomers include divinylbenzene, divinylpyridine, divinyltoluenes, ethylene glycol dimethacrylate, etc. The emulsion copolymers described above may be converted to positively charged ion exchange resins by methods known in the art. For example, the cross linked styrene emulsion polymer may be chloromethylated with chloromethyl methyl ether in the presence of a Lewis acid such as aluminium chloride and the resulting intermediate emulsion copolymer may then be treated with a tertiary amine such as trimethyl amine to form a quaternary amine chloride functional group. Alternatively, a strongly basic quaternary amine resin may be prepared by treating a cross-linked acrylic ester emulsion copolymer with a diamine containing both a tertiary amine group and a primary or secondary amine group, such as dimethylaminopropyl amine or di-(3-dimethylaminopropyl)-amine and quaternising the resulting weakly basic resin with an alkyl halide such as methyl chloride anion.

Suitable non-cross-linked quaternary ammonium polymers include dimethylaminoethyl methacrylate polymer, quaternised with epichlorhydrin or ethylene oxide, poly-N,N-dimethyl-3,5-methylene piperidinium salt, polyethylene amine, polymers of di-methyl-di-allyl ammonium salt, where the salt counterion can be any water soluble ion such as chloride ion; co-polymers of dimethyl amine or mono-ethyl amine and epichlorhydrin, and quaternised forms of the above co-polymers, and modified natural organic polyelectrolytes such as guar gum treated with di-ethylaminoethylchlorid-hydrochloride.

Further suitable cationic polymers include cationic quaternary ammonium salts based on fatty amines and amphoteric quaternary ammonium salts based on fatty amines.

Cationic quaternary ammonium salts based on fatty amines comprise 1-propanaminium-N-(2-hydroxyethyl)-N,N-dimethyl-3-[(1-oxooctadecyl)-amino] salts, 1-propanaminium-N,N,N-trimethyl-3-[(1-oxododecyl)-amino] alkyl ester salts, 1-propanaminium-(3-dodecyloxy)-2-hydroxy-N,N-bis-(2-hydroxyethyl)-N-methyl alkyl ester salts. Suitable anions are for example phosphate, nitrate, sulfate and methylsulfate.

Further suitable cationic quaternary ammonium salts are quaternised aliphatic amine ethoxylates wherein the nitrogen atom is quaternised. Additionally, alkylbenzyldimethylammoniumchlorides wherein the alkyl group is derived from a fatty acid may be employed.

Suitable alkanol amine compounds are lower alkanol amine compounds such as dieethanolamine, triethanolamine, monoisopropanolamine, diisopropanolamine, triisopropanolamine, mono-sec-butanolamine, di-sec-butanolamine, 2-amino-2-methyl-1-propanediol, 2-amino-2-ethyl-1,3-propanediol, 2-dimethylamino-2-methyl-1-propanol, tris(hydroxymethyl) aminoethane and mixtures of the aforementioned alkanol amine compounds.

Suitable aminocarboxylic acids include ethylenediaminetetraacetic acid, hydroxyethylenediaminetetraacetic acid, nitrilotriacetic acid, hydroxyethylenediaminetriacetic acid, N-dihydroxyethylglycine, ethylenebis(hydroxyphenylglycine), lysine, alanine, valine, leucine, isoleucine, proline, phenylalanine, tryptophan, methionine, glycine, serine, threonine, cysteine, tyrosine, asparagine, glutamine, aspartic acid, glutamic acid, arginine, histidine and mixtures thereof.

Suitable hydroxycarboxylic acids include tartaric acid, citric acid, gluconic acid, 5-sulfosalicylic acid and mixtures thereof.

The concentration of the at least one nitrogen-containing compound or hydroxy carboxylic acid generally ranges from 0.1 to 30 g/l, more preferably from 1 to 10 g/l and most preferably from 2 to 5 g/l.

Optionally the aqueous solution used in step (iii) comprises a wetting agent and/or an anti-flocculation agent.

Optionally, the substrate surface is then rinsed with water.

Next, at least one layer of a metal or a metal alloy is deposited in step (iv) onto the activated substrate surface by electroless plating.

Examples for metals and metal alloys which can be deposited by electroless plating processes in the method according to the present invention are copper, nickel, gold, palladium, ruthenium, tin, silver and alloys thereof.

Preferably, copper, copper alloys, nickel and nickel alloys are deposited ion step (iv).

Most preferably, copper or copper alloys are deposited in step (iv).

Copper electroless plating electrolytes comprise generally a source of copper ions, pH modifiers, complexing agents such as EDTA, alkanol amines or tartrate salts, accelerators, stabilizer additives and a reducing agent. In most cases formaldehyde is used as reducing agent, other common reducing agents are hypophosphite, dimethylamine borane and borohydride. Typical stabilizer additives for electroless copper plating electrolytes are compounds such as mercaptobenzothiazole, thiourea, various other sulphur compounds, cyanide and/or ferrocyanide and/or cobaltocyanide salts, polyethyleneglycol derivatives, heterocyclic nitrogen compounds, methyl butynol, and propionitrile. In addition, molecular oxygen is often used as a stabilizer additive by passing a steady stream of air through the copper electrolyte (ASM Handbook, Vol. 5: Surface Engineering, pp. 311-312).

Another important example for electroless metal and metal alloy plating electrolytes are compositions for deposition of nickel and alloys thereof. Such electrolytes are usually based on hypophosphite compounds as reducing agent and further contain mixtures of stabilizer additives which are selected from the group comprising compounds of Group VI elements (S, Se, Te), oxo-anions ($AsO_2^-$, $IO_3^-$, $MoO_4^{2-}$), heavy metal cations ($Sn^{2+}$, $Pb^{2+}$, $Hg^+$, $Sb^{3+}$) and unsaturated organic acids (maleic acid, itaconic acid) (Electroless Plating: Fundamentals and Applications, Eds.: G. O. Mallory, J. B. Hajdu, American Electroplaters and Surface Finishers Society, Reprint Edition, pp. 34-36).

A preferred process sequence according to the present invention comprises in this order the steps of
(i) providing a non-conductive substrate having on at least one side a surface consisting of a metal or metal alloy structure selected from the group consisting of molybdenum, titanium, zirconium, aluminium, chromium, tungsten, niobium, tantalum and alloys thereof,
(ii) contacting said substrate with an activator comprising a noble metal as noble metal ions, whereby only the metal or metal alloy structure is activated,
(iii) contacting said substrate with an aqueous solution containing at least one of a nitrogen-containing substance and a hydroxy carboxylic acid and
(iv) depositing a metal or metal alloy onto said activated metal or metal alloy structure by means of electroless plating.

Metal or metal alloy layers deposited onto a metal or metal alloy structure which consists of a metal such as molybdenum, titanium, zirconium, aluminium, chromium, tungsten, niobium, tantalum and alloys thereof by the method according to the present invention have a high adhesion, sufficient electrical conductivity, a uniform thickness distribution and a smooth surface.

EXAMPLES

The invention will now be illustrated by reference to the following non-limiting examples.

Example 1 (Comparative)

A glass substrate having a layer of molybdenum attached to one side was activated with a conditioner comprising a quaternary ammonium polymer and then by immersion-type plating of palladium. Next, a layer of copper was deposited from a plating bath comprising copper ions, formaldehyde, EDTA and stabilizing agents. Hence, no step (iii) according to the general process sequence was applied.

Without step (iii) the deposited copper layer exhibits the typical structures of collapsed blisters, indicating poor adhesion on the molybdenum layer.

Example 2

A glass substrate having a layer of molybdenum attached to one side was activated with by immersion-type plating of palladium. The activated substrate was then dipped into an aqueous solution having a pH value of 12 to 12.5 and comprising 3.1 g/l of a polyamido amine for 20 s. Next, a layer of copper was deposited from a plating bath comprising copper ions, formaldehyde, EDTA and stabilizing agents. Hence, step (iii) was applied this time according to the general process sequence.

With step (iii) the deposited copper layer shows a sufficient adhesion on the molybdenum layer.

The invention claimed is:
1. A method for electroless plating comprising in this order the steps of
   (i) providing a non-conductive substrate having on at least one side attached thereto a metal or metal alloy structure selected from the group consisting of molybdenum, titanium, zirconium, aluminium, chromium, tungsten, niobium, tantalum and alloys thereof,
   (ii) contacting said substrate with an activator comprising palladium ions,
   (iii) contacting said substrate with an aqueous solution containing at least one nitrogen-containing substance selected from the group consisting of quaternary ammonium polymers, polyamido amines, tetra-ammonium hydroxy compounds having alkyl groups with 2 to 6 carbon atoms, alkanol amines, quaternary ammonium salts based on fatty amines and quaternised aliphatic amine ethoxylates and mixtures thereof, and
   (iv) depositing a metal or metal alloy onto said activated surface by means of electroless plating.

2. A method according to claim 1 wherein the metal or metal alloy structure in step (i) is selected from the group consisting of molybdenum, titanium and alloys thereof.

3. A method according to claim 1 wherein the aqueous solution in step (iii) further comprises a hydroxy carboxylic acid.

4. A method according to claim 1 wherein the metal or metal alloy deposited in step (iv) is selected from the group consisting of copper, copper alloys, nickel and nickel alloys.

5. A method according to claim 3 wherein the hydroxy carboxylic acid in step (iii) comprises tartaric acid, citric acid, gluconic acid, 5-sulfosalicylic acid or mixtures of two or more thereof.

6. A method according to claim 1 wherein in step (ii) the palladium ions are deposited on the metal or metal alloy structure by an immersion-type reaction.

7. A method according to claim 1 wherein the at least one nitrogen-containing substance in step (iii) is selected from the group consisting of quaternary ammonium polymers and polyamido amines.

* * * * *